United States Patent
Holtan

(10) Patent No.: US 8,684,373 B2
(45) Date of Patent: Apr. 1, 2014

(54) CART MOVING MACHINE

(75) Inventor: Paul David Holtan, Savage, MN (US)

(73) Assignee: Dane Technologies, Inc., Brooklyn Park, MN (US)

( * ) Notice: Subject to any disclaimer, the term of this patent is extended or adjusted under 35 U.S.C. 154(b) by 429 days.

(21) Appl. No.: 12/564,240

(22) Filed: Sep. 22, 2009

(65) Prior Publication Data

US 2010/0078905 A1    Apr. 1, 2010

Related U.S. Application Data

(60) Provisional application No. 61/099,454, filed on Sep. 23, 2008.

(51) Int. Cl.
  *B62B 3/00*    (2006.01)
(52) U.S. Cl.
  CPC .................................. *B62B 3/00* (2013.01)
  USPC .................................. 280/47.11; 80/33.991
(58) Field of Classification Search
  USPC ......... 180/65.1, 19.3, 19.2, 19.1, 11, 23, 253, 180/211, 292, 332; 280/33.991, 33.992, 280/47.11
  See application file for complete search history.

(56) References Cited

U.S. PATENT DOCUMENTS

| | | |
|---|---|---|
| 1,050,919 A | 1/1913 | Conley |
| 2,381,190 A | 8/1945 | Tiner et al. |
| 2,497,234 A | 2/1950 | Salvatore |
| 2,518,816 A | 8/1950 | Powers |
| 2,621,687 A | 12/1952 | William |
| 2,666,654 A | 1/1954 | Gray |
| 2,695,179 A | 11/1954 | Fancsali |
| 2,790,992 A | 10/1955 | Cushman |
| 2,790,513 A | 4/1957 | Draxler |
| 2,827,307 A | 3/1958 | Osborn |
| 2,846,018 A | 8/1958 | Puckett |
| 2,877,911 A | 3/1959 | Arnot |
| 2,904,202 A | 9/1959 | Brady |
| 2,935,161 A | 5/1960 | Comfort |
| 3,127,209 A | 3/1964 | Faust et al. |

(Continued)

FOREIGN PATENT DOCUMENTS

| | | |
|---|---|---|
| AT | 340315 | 12/1977 |
| BE | 1012207 | 7/2000 |

(Continued)

OTHER PUBLICATIONS

Dane Industries, Brochure "Productivity Solutions from the Industry Leader", 2 pages, 2001.

(Continued)

*Primary Examiner* — Hau Phan

(74) *Attorney, Agent, or Firm* — Davis, Brown, Koehn, Shors & Roberts, P.C.; Sean D. Solberg

(57) ABSTRACT

A cart moving machine including a body portion, a movement assembly positioned on the body and including a power source coupled to a drive mechanism, the movement assembly being adapted to translate the machine relative to a surface, a hitch positioned on the body and adapted to engage a cart, a mast extending from the body and including a beacon positioned thereon, and a mast positioning mechanism, the mechanism adapted to allow the mast to be selectively positionable relative to the body between a protected position and an exposed position.

25 Claims, 16 Drawing Sheets

(56) References Cited

U.S. PATENT DOCUMENTS

| | | | |
|---|---|---|---|
| 3,503,466 A * | 3/1970 | Rosander | 180/11 |
| 3,524,512 A | 8/1970 | Voeks et al. | |
| 3,575,250 A | 4/1971 | Dykes | |
| 3,633,086 A | 1/1972 | Speth et al. | |
| 3,791,474 A | 2/1974 | Stammen et al. | |
| 3,876,024 A | 4/1975 | Shieman et al. | |
| 3,887,095 A | 6/1975 | Suzuki | |
| 3,922,006 A | 11/1975 | Borges | |
| 3,951,434 A | 4/1976 | Sause | |
| 4,029,333 A | 6/1977 | Christensen | |
| 4,053,025 A | 10/1977 | Slusarenko | |
| 4,096,920 A | 6/1978 | Heyn | |
| 4,265,337 A | 5/1981 | Dammeyer | |
| 4,266,903 A | 5/1981 | Surbrook | |
| 4,531,757 A | 7/1985 | Kuhn | |
| 4,573,549 A | 3/1986 | Pankow | |
| 4,611,948 A | 9/1986 | Johnson | |
| 4,634,337 A | 1/1987 | Hamman | |
| 4,730,685 A | 3/1988 | Sinkkonen | |
| 4,771,840 A | 9/1988 | Keller | |
| 4,793,763 A | 12/1988 | Bubik | |
| 4,811,988 A * | 3/1989 | Immel | 180/19.1 |
| 4,878,050 A | 10/1989 | Kelley | |
| 4,942,529 A | 7/1990 | Avitan et al. | |
| 4,964,837 A | 10/1990 | Collier | |
| 5,011,169 A | 4/1991 | Henderson et al. | |
| 5,048,626 A | 9/1991 | Stehler et al. | |
| 5,064,012 A | 11/1991 | Losego | |
| 5,082,074 A | 1/1992 | Fischer | |
| 5,096,358 A | 3/1992 | Plant et al. | |
| 5,143,393 A | 9/1992 | Meyer | |
| 5,161,634 A | 11/1992 | Ichihara et al. | |
| 5,167,389 A | 12/1992 | Reimers | |
| 5,322,306 A | 6/1994 | Coleman | |
| 5,322,313 A | 6/1994 | Schroeder | |
| 5,340,202 A | 8/1994 | Day | |
| 5,388,176 A | 2/1995 | Dykstra et al. | |
| 5,439,069 A * | 8/1995 | Beeler | 180/11 |
| 5,483,615 A | 1/1996 | Hallidy | |
| 5,484,046 A * | 1/1996 | Alper et al. | 280/655.1 |
| 5,511,926 A | 4/1996 | Iles | |
| 5,518,260 A | 5/1996 | Grignon | |
| 5,560,630 A | 10/1996 | Phares et al. | |
| 5,573,078 A | 11/1996 | Stringer et al. | |
| 5,580,207 A | 12/1996 | Kiebooms et al. | |
| 5,592,355 A | 1/1997 | Ikkai et al. | |
| 5,633,544 A | 5/1997 | Toida et al. | |
| 5,743,347 A | 4/1998 | Gingerich | |
| 5,762,155 A | 6/1998 | Scheulderman | |
| 5,769,051 A | 6/1998 | Bayron et al. | |
| 5,783,989 A | 7/1998 | Issa et al. | |
| 5,791,669 A | 8/1998 | Broddon et al. | |
| 5,808,376 A | 9/1998 | Gordon et al. | |
| 5,860,485 A | 1/1999 | Ebbenga | |
| 5,880,652 A | 3/1999 | Snel | |
| 5,890,727 A | 4/1999 | May | |
| 5,934,694 A | 8/1999 | Schugt et al. | |
| 5,947,490 A | 9/1999 | Munnoch et al. | |
| 5,964,313 A | 10/1999 | Guy | |
| 5,983,614 A | 11/1999 | Hancock et al. | |
| 5,984,333 A | 11/1999 | Constantijn et al. | |
| 6,022,031 A | 2/2000 | Reiland et al. | |
| 6,060,859 A | 5/2000 | Jonokuchi | |
| 6,070,679 A * | 6/2000 | Berg et al. | 180/19.2 |
| 6,109,379 A | 8/2000 | Madwed | |
| 6,116,633 A | 9/2000 | Pride | |
| 6,144,125 A | 11/2000 | Birkestrand et al. | |
| 6,168,367 B1 | 1/2001 | Robinson | |
| 6,220,379 B1 | 4/2001 | Schugt et al. | |
| 6,244,366 B1 | 6/2001 | Otterson et al. | |
| 6,260,643 B1 | 7/2001 | Schuchardt | |
| 6,352,130 B2 | 3/2002 | Klein et al. | |
| 6,378,642 B1 | 4/2002 | Sutton | |
| 6,406,250 B2 | 6/2002 | Jaeger et al. | |
| 6,435,803 B1 | 8/2002 | Robinson | |
| 6,481,514 B2 | 11/2002 | Takada | |
| D475,645 S | 6/2003 | Hoonsbeen | |
| 6,681,877 B2 | 1/2004 | Ono et al. | |
| 6,685,211 B2 | 2/2004 | Iles | |
| 6,729,421 B1 | 5/2004 | Gluck et al. | |
| 6,729,636 B1 | 5/2004 | Lynch et al. | |
| 6,820,887 B1 | 11/2004 | Riggle | |
| 6,871,714 B2 | 3/2005 | Johnson | |
| 6,880,652 B2 | 4/2005 | Holtan et al. | |
| 6,997,471 B1 | 2/2006 | Daniel | |
| 7,029,019 B1 | 4/2006 | Dye | |
| 7,134,515 B2 | 11/2006 | Lenkman | |
| 7,219,754 B2 | 5/2007 | Johnson | |
| 7,389,836 B2 | 6/2008 | Johnson et al. | |
| 7,395,886 B2 * | 7/2008 | Berg et al. | 180/19.2 |
| 7,462,009 B2 * | 12/2008 | Hartmann et al. | 280/651 |
| 7,481,286 B2 * | 1/2009 | Ruschke et al. | 180/19.1 |
| 7,493,979 B2 | 2/2009 | Johnson et al. | |
| 7,533,742 B2 | 5/2009 | Johnson et al. | |
| 7,549,651 B2 * | 6/2009 | Holtan et al. | 280/33.992 |
| 7,571,914 B2 * | 8/2009 | Holtan et al. | 280/33.991 |
| 7,699,128 B1 * | 4/2010 | Strauss | 180/65.1 |
| 7,878,277 B2 * | 2/2011 | Turner | 180/19.3 |
| 2002/0053782 A1 | 5/2002 | Peters | |
| 2003/0231945 A1 | 12/2003 | Weatherly | |
| 2004/0134692 A1 | 7/2004 | Kime et al. | |
| 2004/0245030 A1 | 12/2004 | Holtan et al. | |
| 2004/0256166 A1 | 12/2004 | Holtan et al. | |
| 2005/0006874 A1 | 1/2005 | Mrofka et al. | |
| 2005/0098364 A1 | 5/2005 | Johnson et al. | |
| 2005/0116431 A1 | 6/2005 | Holtan et al. | |
| 2006/0000664 A1 | 1/2006 | Huang et al. | |
| 2006/0102392 A1 | 5/2006 | Johnson et al. | |
| 2006/0197295 A1 | 9/2006 | Holtan et al. | |
| 2006/0243500 A1 | 11/2006 | Wiff et al. | |
| 2006/0244226 A1 | 11/2006 | Ondrasik | |
| 2006/0273547 A1 | 12/2006 | Holtan et al. | |
| 2007/0013157 A1 | 1/2007 | Wiff et al. | |
| 2007/0145707 A1 | 6/2007 | Johnson | |
| 2007/0181352 A1 | 8/2007 | Holtan et al. | |
| 2007/0289787 A1 | 12/2007 | Wiff et al. | |
| 2009/0267322 A1 | 10/2009 | Holtan et al. | |

FOREIGN PATENT DOCUMENTS

| | | |
|---|---|---|
| EP | 0326754 | 8/1989 |
| EP | 0405230 | 1/1991 |
| EP | 1454787 | 9/2004 |
| FR | 2246415 | 5/1975 |
| FR | 2587291 | 9/1985 |
| GB | 1601930 | 11/1981 |
| GB | 2332405 | 6/1999 |
| GB | 2342327 | 4/2000 |
| NL | 1016924 | 6/2002 |
| WO | 88/06385 | 8/1988 |
| WO | 96/03305 | 2/1996 |
| WO | 01/85086 | 11/2001 |

OTHER PUBLICATIONS

Dane Industries Product Brochure for QuicKART 1000 Power Pal, 2 pages, 2001.

Dane Industries Product Brochure for QuicKART 2000, 2 pages, 2001.

Dane Industries Product Brochure for PowerPal 3000, 2 pages, 2001.

Dane Industries Product Brochure for QuicKART 5000, 2 pages, 2001.

Declaration of David Leckey, Executive Vice President of Dane Technologies, Inc., attaching photos showing a motorized Quickart 2000 shopping cart mover with a hitch that allows the Quickart 2000 to move two side-by-side lines of shopping carts, labeled "Exhibit A", "Exhibit B" and "Exhibit C", 4 pages, at least as early as Oct. 27, 2003.

Declaration of William A. Grimes, Senior Vice President of Dane Industries, Inc., attaching photos showing a motorized shopping cart mover and hitch, labeled "Exhibit E" and "Exhibit F", and showing a motorized shopping cart mover employing a second type of hitch for

(56) References Cited

OTHER PUBLICATIONS attaching to a shopping cart, labeled "Exhibit G", "Exhibit H" and "Exhibit I", 6 pages, at least as early as Autumn 2004.

Declaration of James W. Wiff, Vice President, Engineering and Product Development of Dane Industries, Inc., attaching photos showing various hitches observed at the United States Postal Service facility, labeled "Exhibit J", "Exhibit K", "Exhibit L", "Exhibit M" and "Exhibit N", 6 pages, at least as early as the period between Oct. 6, 2004 and Oct. 20, 2004.

Declaration of William A. Grimes, Senior Vice President of Retail Sales of Dane Industries, Inc., attaching photos showing a motorized shopping cart mover with a hitch that is configured to attach to a shopping cart, labeled "Exhibit O", "Exhibit P" and "Exhibit Q", 4 pages, at least as early as 2001.

Declaration of David A. Leckey, Executive Vice President of Dane Industries, Inc., attaching photos showing a hitch of a motorized shopping cart mover that is configured to receive the rear wheels of a shopping cart, labeled "Exhibit R", "Exhibit S" and "Exhibit T", 4 pages, at least as early as Aug. 4, 2003.

Declaration of William A. Grimes, Senior Vice President of Retail Sales of Dane Industries, Inc., attaching photos showing a hitch of a motorized shopping cart mover that is configured to enter the rear of a shopping cart, labeled "Exhibit U", "Exhibit V" and "Exhibit W", 4 pages, at least as early as Aug. 31, 2004.

Declaration of William A. Grimes, Senior Vice President of Dane Industries, Inc., attaching a photo showing a hitch of a motorized shopping cart mover that is configured to receive the rear wheels of a shopping cart, labeled "Exhibit X", 2 pages, at least as early as Jan. 13, 2003.

Declaration of James W. Wiff, Vice President, Engineering and Product Development of Dane Industries, Inc., attaching photos showing a collapsible pallet, labeled "Exhibit AA" and "Exhibit BB", 3 pages, at least as early as May 21, 2004.

Declaration of Paul D. Holtan, Senior Staff Engineer at Dane Industries, Inc., attaching photos showing a hitch for attachment to a motorized shopping cart mover, labeled "Exhibit X", "Exhibit XI", "Exhibit XII", "Exhibit XIII", "Exhibit XIV", "Exhibit XV", "Exhibit XVI", "Exhibit XVII" and "Exhibit XVII", 10 pages, at least as early as Jan. 1, 2002.

ISR (for English abstract of AT34015)—Just enclose; do not cite.
Written Opinion (for English abstract of AT34105)—Just enclose; do not cite.
International Search Report, PCT/US2004/034009, Mar. 2, 2006.
Nonfinal Office Action, U.S. Appl. No. 11/770,436, 13 pages, Oct. 6, 2009.
Restriction Requirement, U.S. Appl. No. 11/696,534, 6 pages, Apr. 21, 2008.
Response to Restriction Requirement, U.S. Appl. No. 11/696,534, 11 pages, May 21, 2008.
Nonfinal Office Action U.S. Appl. No. 11/696,534, 17 pages, Jul. 17, 2008.
Response to Nonfinal Office Action U.S. Appl. No. 11/696,534, 6 pages, Oct. 17, 2008.
Notice of Allowance, U.S. Appl. No. 11/696,534, 7 pages, Feb. 27, 2009.
Non-Final Office Action, U.S. Appl. No. 11/682,562, 13 pages, Jan. 9, 2008.
Amendment and Response to Non-Final Office Action, U.S. Appl. No. 11/682,562, 14 pages, May 9, 2008.
Final Office Action, U.S. Appl. No. 11/682,562, 10 pages, Aug. 21, 2008.
Restriction Requirement, U.S. Appl. No. 11/422,552, 6 pages, Mar. 18, 2009.
Response to Restriction Requirement, U.S. Appl. No. 11/422,552, 7 pages, Apr. 20, 2009.
Nonfinal Office Action , U.S. Appl. No. 11/422,552, 14 pages, Aug. 5, 2009.
Amendment and Response to Nonfinal Office Action, U.S. Appl. No. 11/422,552, 13 pages, Nov. 4, 2009.
Final Office Action, U.S. Appl. No. 11/422,552, 6 pages, Feb. 5, 2010.
Non-Final Office Action, U.S. Appl. No. 11/361,136, 10 pages, Jan. 10, 2008.
Amendment and Response to Non-Final Office Action, U.S. Appl. No. 11/361,136, 9 pages, May 9, 2008.
Final Office Action, U.S. Appl. No. 11/361,136, 10 pages, Sep. 8, 2008.
Restriction Requirement, U.S. Appl. No. 11/356,923, 10 pages, Jul. 17, 2008.
Response to Restriction Requirement, U.S. Appl. No. 11/365,923, 13 pages, Aug. 18, 2008.
Non-Final Office Action, U.S. Appl. No. 11/356,923, 12 pages, Nov. 7, 2008.
Response to Nonfinal Office Action U.S. Appl. No. 11/365,923, 9 pages, Feb. 9, 2009.
Notice of Allowance, U.S. Appl. No. 11/356,923, 5 pages, mailed Apr. 6, 2009.
Non-Final Office Action, U.S. Appl. No. 11/254,564, 18 pages, Jan. 9, 2008.
Amendment and Response to Non-Final Office Action, U.S. Appl. No. 11/254,564, 21 pages, May 9, 2008.
Final Office Action, U.S. Appl. No. 11/254,564, 18 pages, Sep. 16, 2008.
Response to Final Office Action, U.S. Appl. No. 11/254,564, filed Dec. 16, 2008.
Notice of Allowance, U.S. Appl. No. 11/254,564, Jan. 12, 2009 4 pages.
Non-Final Office Action, U.S. Appl. No. 11/184,095, 21 pages, Apr. 4, 2008.
Restriction Requirement, U.S. Appl. No. 10/947,831, 6 pages, Nov. 27, 2006.
Amendment and Response to Restriction Requirement, U.S. Appl. No. 10/947,831, 11 pages, Feb. 21, 2007.
Non-Final Office Action, U.S. Appl. No. 10/947,831, 18 pages, Apr. 24, 2007.
Amendment and Response to Non-Final Office Action, U.S. Appl. No. 10/947,831, 13 pages, Aug. 22, 2007.
Final Office Action, U.S. Appl. No. 10/947,831, 4 pages, Oct. 25, 2007.
Amendment and Response to Final Office Action, U.S. Appl. No. 10/947,831, 12pages, Jan. 25, 2008.
Notice of Allowance, U.S. Appl. No. 10/947,831, 7pages, Feb. 22, 2008.
Restriction Requirement, U.S. Appl. No. 10/836,593, 6 pages, Nov. 23, 2005.
Amendment and Response to Restriction Requirement, U.S. Appl. No. 10/836,593, 9 pages, Dec. 21, 2005.
Non-Final Office Action, U.S. Appl. No. 10/836,593, 20 pages, Feb. 13, 2006.
Amendment and Response to Non-Final Office Action, U.S. Appl. No. 10/836,593, 15 pages, Jul. 5, 2006.
Final Office Action, U.S. Appl. No. 10/836,593, 18 pages, Sep. 15, 2006.
Amendment and Response to Final Office Action, U.S. Appl. No. 10/836,593, 16 pages, Nov. 7, 2006.
Non-Final Office Action, U.S. Appl. No. 10/836,593, 17 pages, Jan. 22, 2007.
Amendment and Response to Non-Final Office Action, U.S. Appl. No. 10/836,593, 21 pages, May 22, 2007.
Final Office Action, U.S. Appl. No. 10/836,593, 22 pages, Aug. 14, 2007.
Amendment and Response to Office Action, U.S. Appl. No. 10/836,593, 15 pages, Oct. 31, 2007.
Non-Final Office Action, U.S. Appl. No. 10/836,593, 18 pages, Nov. 28, 2007.
Notice of Appeal and Pre-Appeal Brief Conference Request, U.S. Appl. No. 10/836,593, 9 pages, Apr. 17, 2008.
Amendment and Response, U.S. Appl. No. 10/836,593, 17 pages Jan. 16, 2009.
Non-Final Office Action, U.S. Appl. No. 10/836,593 10 pages Feb. 20, 2009.

(56) References Cited

OTHER PUBLICATIONS

Amendment and Response to Office Action, U.S. Appl. No. 10/836,593, 9 pages, May 20, 2009.
Notice of Allowance, U.S. Appl. No. 10/836,593, 4 pages, Sep. 10, 2009.
Preliminary Amendment, U.S. Appl. No. 11/017,975, 10 pages, Mar. 3, 2005.
Restriction Requirement, U.S. Appl. No. 11/017,975, 5 pages, Jul. 26, 2005.
Amendment and Response to Restriction Requirement, U.S. Appl. No. 11/017,975, 12 pages, Aug. 23, 2005.
Non-Final Office Action, U.S. Appl. No. 11/017,975, 7 pages, Jan. 4, 2006.
Amendment and Response to Non-Final Office Action, U.S. Appl. No. 11/017,795, 16 pages, May 1, 2006.
Final Office Action, U.S. Appl. No. 11/017,795, 11 pages, Oct. 6, 2006.
Amendment and Response to Final Office Action, U.S. Appl. No. 11/017,795, 9 pages, Dec. 6, 2006.
Notice of Allowance, U.S. Appl. No. 11/017,795, 6 pages, Jan. 5, 2007.
Restriction Requirement, U.S. Appl. No. 10/965,281, 5 pages, Dec. 8, 2005.
Amendment and Response to Restriction Requirement, U.S. Appl. No. 10/965,281, 13 pages, Feb. 2, 2006.
Non-Final Office Action, U.S. Appl. No. 10/965,281, 15 pages, Mar. 28, 2006.
Amendment and Response to Non-Final Office Action, U.S. Appl. No. 10/965,281, 19 pages, Aug. 25, 2006.
Final Office Action, U.S. Appl. No. 10/965,281, 11 pages, Oct. 27, 2006.
Non-Final Office Action, U.S. Appl. No. 10/280,157, 7 pages, Apr. 1, 2003.
Amendment and Response to Non-Final Office Action, U.S. Appl. No. 10/280,157, 6 pages, May 1, 2003.
Non-Final Office Action, U.S. Appl. No. 10/280,157, 7 pages, Oct. 22, 2003.
Amendment and Response to Non-Final Office Action, U.S. Appl. No. 10/280,157, 13 pages, Mar. 22, 2004.
Final Office Action, U.S. Appl. No. 10/280,157, 7 pages, Jul. 15, 2004.
Amendment and Response to Final Office Action, U.S. Appl. No. 10/280,157, 8 pages, Aug. 24, 2004.
Notice of Allowance, U.S. Appl. No. 10/280,157, 5 pages, Oct. 6, 2004.
Notice of Allowance U.S. Appl. No. 12/125,138, 8 pages, Oct. 20, 2008.

\* cited by examiner

CART MOVING MACHINE

CROSS REFERENCE TO RELATED APPLICATION

The present application claims priority to U.S. Provisional Application No. 61/099,454 filed on Sep. 23, 2008 and entitled Cart Pushing Machine without Fixed Handlebar, the contents of which are hereby incorporated by reference herein in their entirety.

FIELD OF THE INVENTION

The present invention relates to moving carts with a mechanical means. More particularly the present invention relates to devices for pushing and/or pulling carts. More particularly the present invention relates to a device for collection of shopping carts by pushing and/or pulling a line of carts.

BACKGROUND

Grocery stores and large retailers in the United States often employ mechanical cart collection methods using cart pushers and/or pullers. Current machines may include a manual control station on one end of the machine complete with steering and forward and reverse throttle controls and various gauges and switches, for example to monitor the machine's operation and turn the machine on and off. In manual operation, the operator may stand at the manual controls and steer the machine and control the throttle. The collection of carts using machines often uses a radio remote control held by the operator at the front of a line of carts to actuate the motor in the machine to push the line of carts to the store. To steer the line of carts, which are stacked together one in front of the other, the operator may push or pull the front of the front cart in the line 5 to 10 degrees to the right or left to begin the turn. Each of the carts and the machine following will follow the turn started by the first cart. On some machines, the radio controls only move the machine forward.

Cart moving machines may include a strobe light mounted high to be visible and warn against the hazard of the slow moving or stopped machine in a parking lot. Some organizations design their buildings with cart doors where cart retrieving personnel can return the carts to the building from the parking lot. These doors often have a reduced door head height, when compared to typical entrance doors, to prevent patrons from using these access points. In some cases, the relatively high strobe on the moving machines can be damaged by inadvertent contact with these door heads. Additionally, cart moving machines may be shipped on pallets and in trucks to the purchaser. At times the strobe light on the machine is damaged during shipping process.

SUMMARY OF THE INVENTION

In one embodiment, a cart moving machine can include a body portion, a movement assembly positioned on the body and including a power source coupled to a drive mechanism, the movement assembly being adapted to translate the machine relative to a surface, a hitch positioned on the body and adapted to engage a cart, a mast extending from the body and including a beacon positioned thereon, and a mast positioning mechanism. The mast positioning mechanism can be adapted to allow the mast to be selectively positionable relative to the body between a protected position and an exposed position. The mast positioning mechanism can be a pivotal connector and the mast can be selectively pivotal between the protected position and the exposed position. The protected position can include a position within a housing of the body and the exposed position can include a position outside the housing, the exposed position adapted to suitably present the beacon. The exposed position can be a generally upright position. The exposed position can also include a generally upright and slightly tipped position. The pivoting connector can be a frictional pivotal connector.

In one embodiment, the pivotal connector can include a bracket connected to the body and a first pivot pin extending through the bracket and the mast. The bracket can include a radial slot with a center point located at the longitudinal axis of the first pivot pin and the pivotal connector can also include a second pivot pin extending through the radial slot and the mast. The first pivot pin can be a removable pin.

In another embodiment, the machine can include a breakaway mechanism adapted to allow the beacon to move relative to the machine from a use position to a released position when a force is applied. The breakaway mechanism can be incorporated into the mast positioning mechanism and the breakaway mechanism can be a friction based mechanism. Alternatively or additionally, the breakaway mechanism can include a biasing mechanism adapted to return the beacon from the released position to the use position when the force is no longer applied. The breakaway mechanism can also be adapted to allow relative motion of the beacon relative to the mast.

In another embodiment, the machine can include a remote control in communication with the movement mechanism. A remote control holder can be provided and can be secured to the machine. In some embodiments, the holder can be secured to the mast, while in other embodiments, the holder can be secured to the body. In still other embodiments, multiple holders can be provided.

In another embodiment, a switch can be provided in communication with the movement mechanism. The switch can include a forward position, a neutral position, and a reverse position. The movement mechanism can be adapted to gradually transition between forward translation and stop and between reverse translation and stop. In addition, the machine can include a handle positioned on the mast and the handle can be a cylindrical grip.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Figure 1:
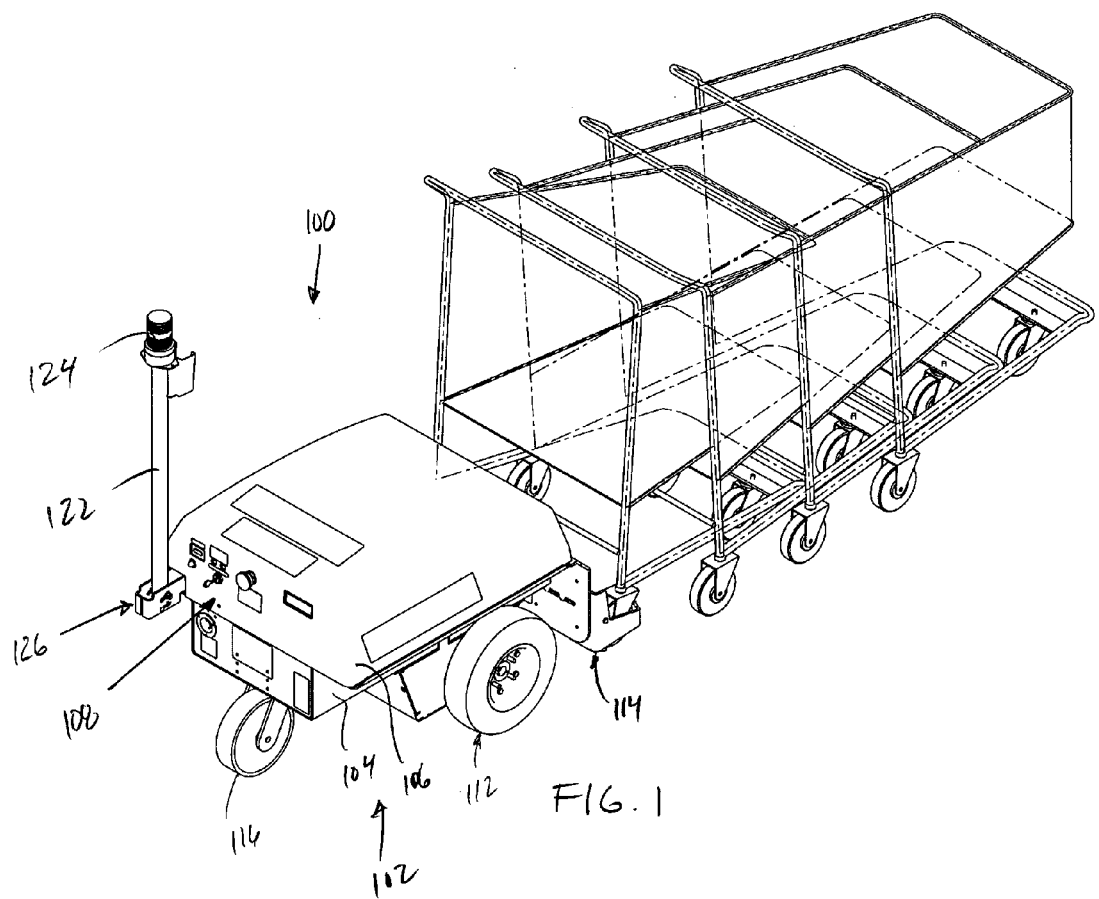
FIG. 1 a rear/side perspective view of a cart moving machine according to one embodiment, in position behind a series of shopping carts.

The present disclosure relates to cart moving machines. More particularly, the present disclosure relates to cart pushing machines for use in collecting one or more shopping carts as shown in FIG. 1. The machines can include a strobe tower that is positionable between a protected position and an exposed position. The protected position can be a position below a hood such that the strobe tower can be protected during shipping, for example. The exposed position can include an upright position such that the strobe can be used to signify a machine location in a crowded parking lot, for example. The strobe tower of the present disclosure can also include a breakaway feature allowing the strobe to breakaway relative to the machine. The strobe can be adapted to breakaway if the machine was to be advanced through a door with a low door head height and the strobe was to encounter the door head, for example. Other features relating to directional switches, a remote control, a holder for the remote control, and a handle are also disclosed.

Referring now to FIGS. 2-14, a first embodiment of a cart moving machine 100 will be described. The cart moving machine 100 can include a body portion, a movement assembly, a hitch 114 positioned on the body and adapted to engage a cart, a mast extending from the body and including a beacon positioned thereon, and a mast positioning mechanism. The machine can also include a breakaway mechanism and a controller for receiving instructions and controlling several aspects of the machine. The machine can also include a power source such as batteries, for example, and an AC power cord and outlet for charging the machine can also be provided.

Figure 2:
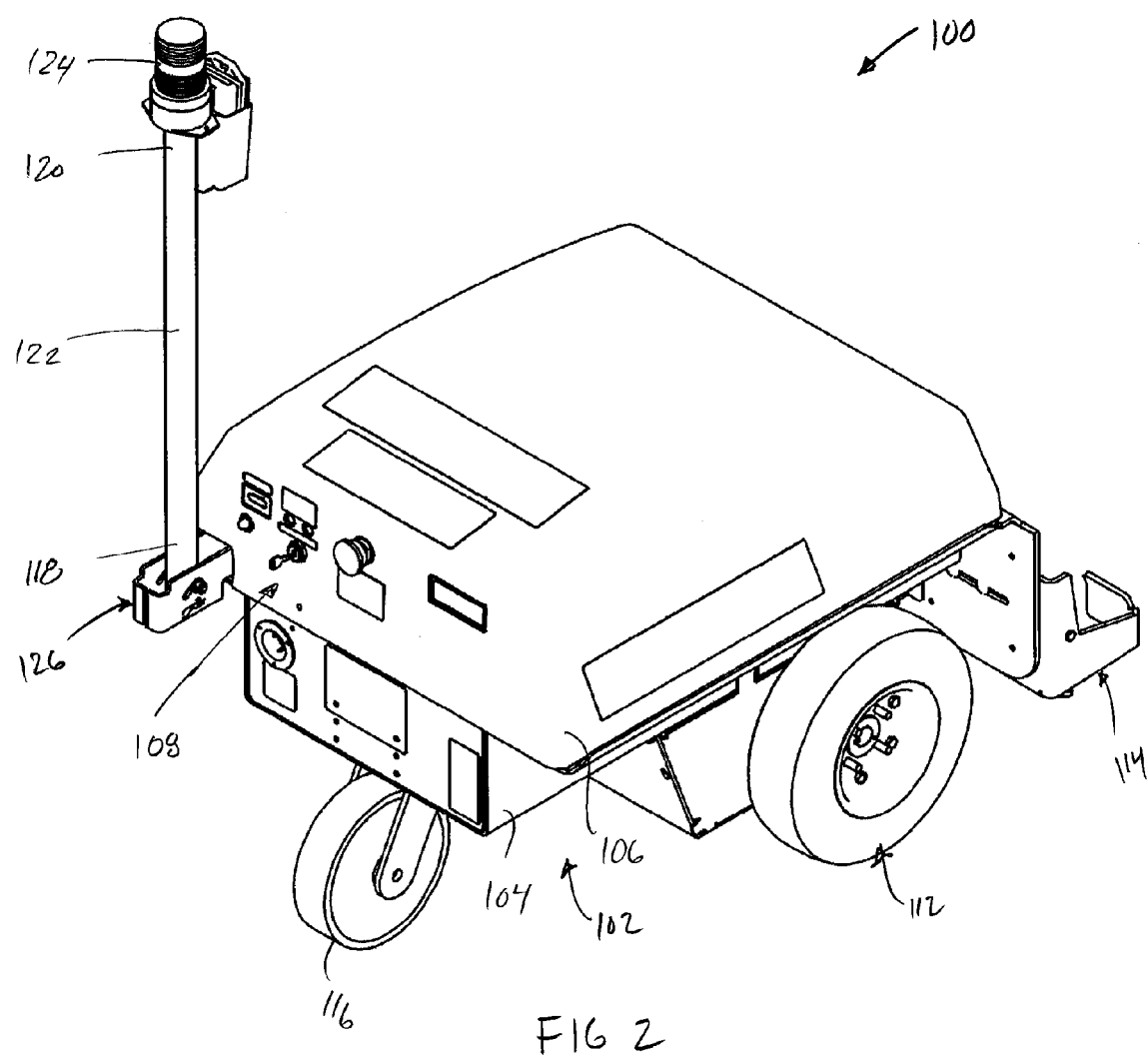
FIG. 2 is a rear/side perspective view of the machine of FIG. 1.

Referring to FIG. 2 and regarding the body portion, the body can include a frame and a housing 102. The housing 102 can include a belly portion 104 and a cover portion 106 and the housing 102 can be adapted to enclose working elements of the machine 100 such as, for example, portions of the movement mechanism, the controller, the power source, and the like. The housing 102 can have interface elements 108 positioned thereon such as several levers, buttons, switches, gauges and the like, for controlling or monitoring several functions of the machine 100. For example, the housing 102 can include a horn button and a brake button associated with a respective horn and brake positioned on the machine. Additional interface elements included on the housing can include an E-shut off, keyswitch, LED's, a BDI, and other features.

Figure 7:
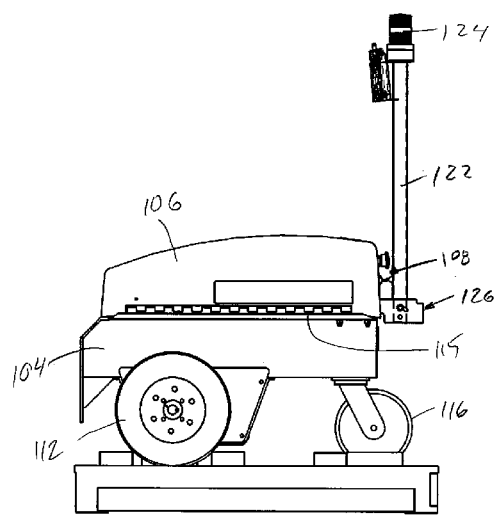
FIG. 7 is a side view of the machine of FIG. 1 with the strobe tower in an upright position.

As shown in FIG. 2, the cover portion 106 can include a hood. The hood can be coupled to the belly 104 via a decoupling connection or series of decoupling connections such as, for example, clips, clamps, latchs, or other decoupling connections such that the hood can be removed or opened. The hood can also include a moveable connection 110 or series of moveable connections 110 such that the hood can be maintain its attachment to the machine 100 if opened. For example, as best shown in FIG. 7, the moveable connection 110 can include a hinge 115 or pivot pin for pivotal opening of the hood. Alternatively, the moveable connection 110 can include a slide track for translational opening of the hood. Some and/or all of the interfacing elements 108 described above can be positioned on the hood.

Still referring to FIG. 2, the machine 100 can also include a movement assembly. The movement assembly can be adapted to cause the machine to translate along a surface such as the ground, a pavement, a building floor, or other surfaces. The movement assembly can include a power source and a drive mechanism. The drive mechanism can include an engine or motor in addition to linkage and a traction device. The linkage can communicate power from the engine or motor to a traction device in the form of a drive wheel, track, or other device for interfacing with a surface. As shown in FIG. 2, the traction device can include a pair of wheels 112.

Figure 3:
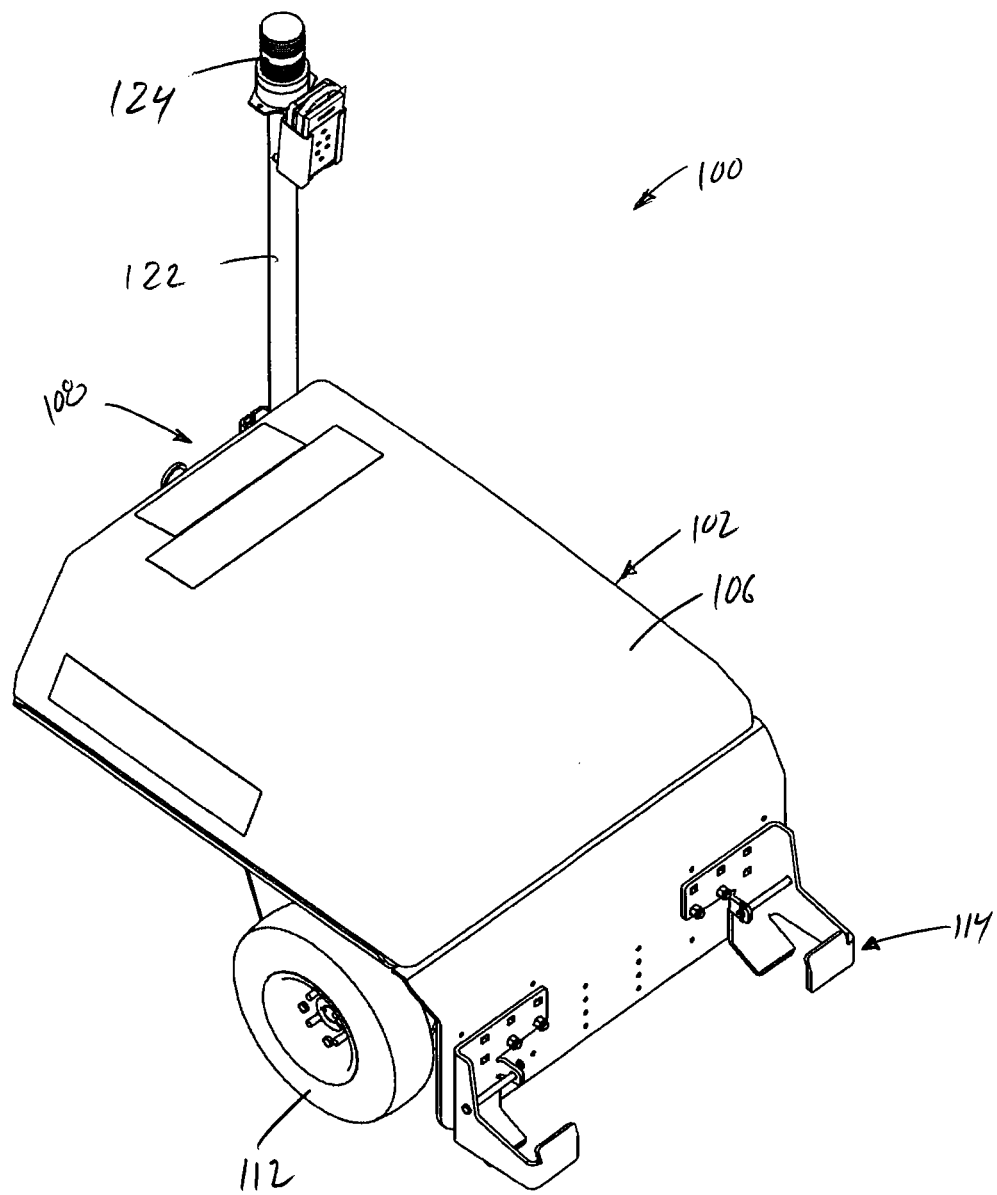
FIG. 3 is front/side perspective view of the machine of FIG. 1.

Referring now to FIG. 3, the machine 100 can also include a hitch 114. As shown, the hitch 114 can be adapted to engage a shopping cart. The engagement can include several different types. In one embodiment, a wheel engager can be provided as shown. The machine 100 can also include a steering pedestal for allowing the machine to turn, steer, or be turned. In one embodiment, the steering pedestal can include a caster wheel 116 as shown in FIG. 2.

The machine 100 can also include a mast extending from the machine. The mast can include an elongate member in the form of a tube, shaft, pole, rod, or other extending piece. The mast can include a machine end 118 proximate to the machine and an opposing beacon end 120. The mast can have a length between the machine end 118 and the beacon end 120 adapted to suitably present the beacon. That is, the length can be sufficient to allow the beacon end 120 to be positioned sufficiently high that drivers and patrons in a parking lot can see the machine amidst a crowed parking lot. For example, the mast may extend to a height sufficient for a person backing a large pickup truck to see the top of the mast over the top of a closed tail gate. The mast can have a beacon positioned on the beacon end 120, and the beacon can be adapted to indicate the location of the machine. Accordingly, the beacon can be in the form of a light, a flashing light, a strobe light, a vibrant colored medallion, a flag, a sign, or other attention attracting element. The mast can be adapted to be selectively positionable relative to the machine 100 such that the mast can be placed in a protected position or an exposed position.

In one embodiment, as shown in FIGS. 2 and 3, the mast can be in the form of a tower 122 extending from the machine 100. The tower 122 can be formed from a cylindrical member and the cylindrical member can include an annular or solid cross-section. For example, a hollow steel tube can be provided. A beacon in the form of a strobe 124 can be secured to the beacon end 120 of the tower 122. The tower 122 can be directly connected to the body of the machine 100 or a mast positioning mechanism can be provided. The tower 122 can have a length between a mast end 118 and a beacon end 120 that can be selected based a the mounting height of the tower 122 and the desired overall height of the tower 122. Consideration can also be given to the ability of the tower 122 to be stored under the hood 106 when determining the length of the tower 122. In some embodiments, the length can range from approximately 12" to approximately 72". In one embodiment, the tower 122 may have a length of approximately 36". In some embodiments, the tower 122 can be positioned on or connected to the machine at a height ranging from approximately 4" to approximately 48" depending on the geometry of the tower 122 and the associated machine. In one embodiment, the tower 122 can be connected to the machine at a height of approximately 12". The length of the tower 122 together with the height at which the tower 122 is connected to the machine can provide an overall height of the tower. In one embodiment, this overall height can be approximately 48".

The beacon shown in FIG. 2 can be adapted to catch a person's attention, but avoid startling or irritating those within viewing distance. The beacon can be in the form of a strobe 124. The strobe 124 can be a relatively slow flashing strobe with a flash speed similar to that of an airplane strobe. For example, the strobe 124 may flash approximately once every second, every two seconds, or some similar interval of time. The strobe 124 can be a ECCO 6221A type strobe. The strobe can be designed to meet SAE J1455, SAE J1318, and CE requirements and can be tested in accordance with UL 583 safety standards for Type E, ES, and EE industrial trucks. Other strobe types can also be used.

The machine can also include a mast positioning mechanism. The mast positioning mechanism can be adapted to allow the mast to be repositioned, particularly to transition the mast between a protected position and an exposed position. The mast positioning mechanism can be in the form of a pivotal, a translating, a telescoping, or other connector allowing relative positioning of the mast to the body of the machine 100. In one embodiment, for example, the mast positioning mechanism can include a single pin extending through the mast and connecting the mast to the body. The pin can create a frictional connection between the mast and the body allowing the mast to be positioned in a protected position along side the body or an exposed position such as, for example, an upright position. In other embodiments, the mast positioning mechanism can include a bracket and a connection to the bracket allowing for repositioning of the mast relative to the body. In other embodiments, the mast positioning mechanism can include a hollow telescope-type receiving tube into which the mast can be retracted. Catch points such as, for example, spring balls with corresponding holes can be used to define the protected and exposed positions.

Figure 4:
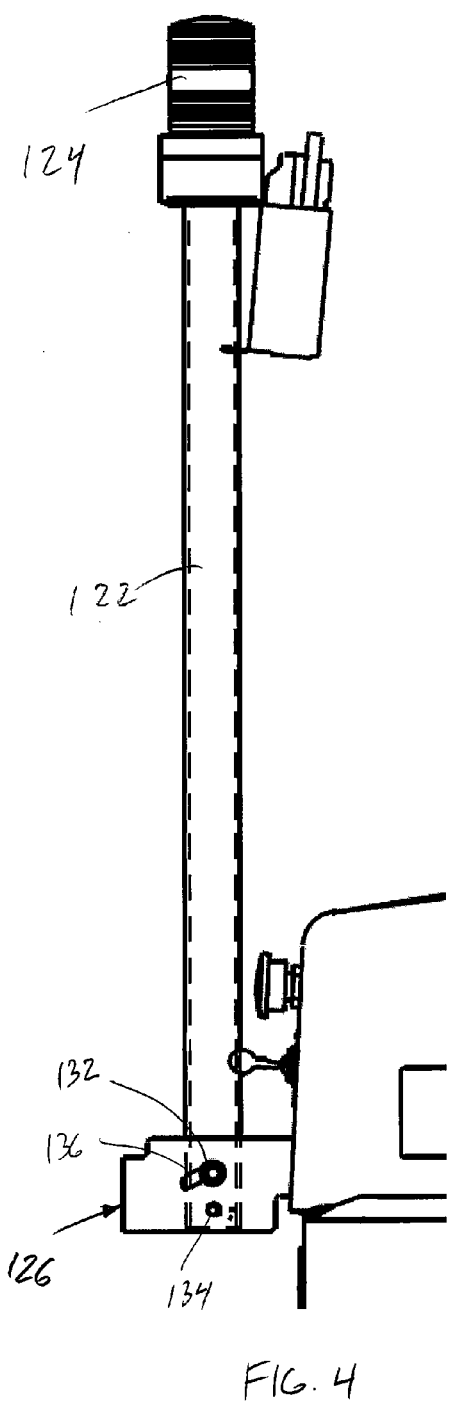
FIG. 4 is a close-up side view of a strobe tower of the machine of FIG. 1.
Figure 5:
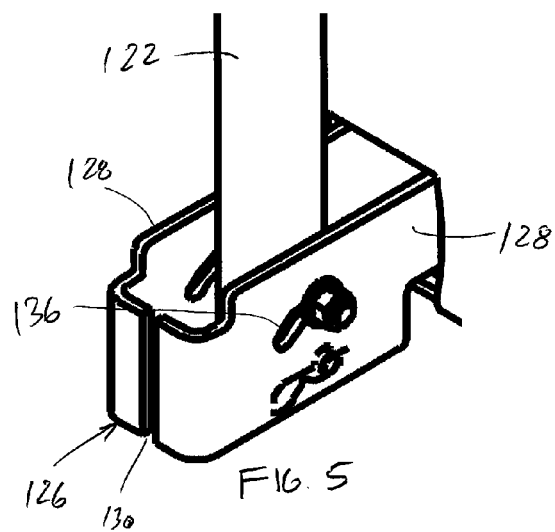
FIG. 5 is a close-up rear/side perspective view of a shoe bracket of the machine of FIG. 1, with an incorporated breakaway mechanism.
Figure 6:
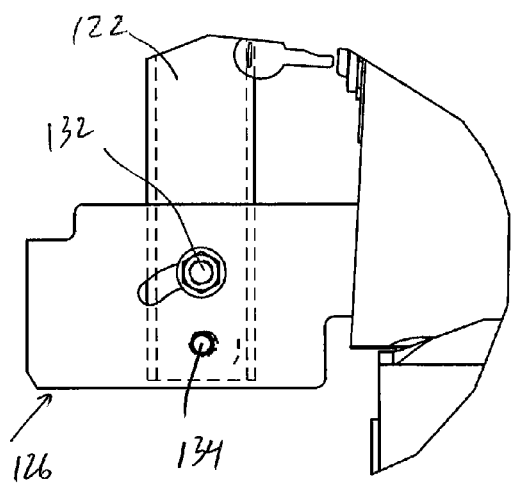
FIG. 6 is a close-up side view of thereof.

Referring to FIGS. 4-6, a pivotal connector type mast positioning mechanism is shown. As shown, the pivotal connector can include a shoe bracket 126 extending from the machine 100. The shoe bracket 126 can include a pair of parallel extending plates 128 spaced from one another a distance approximately equal to the width of the mast and the mast can be positioned there between. The plates 128 can extend from the body of the machine 100 beyond the position of the mast and can further return toward one another. A gap 130 between the returning ends of the plates 128 can be provided to allow the plates 128 to be drawn in tight against the sides of the mast when secured thereto.

Still referring to FIGS. 4-6, the mast positioning mechanism, in one embodiment, can include a pair of positioning pins. As shown, a pivot pin 132 and an adjustment pin 134 can be provided. That is, the pivot pin 132 can be a relatively permanent pin in the form of a bolt, a shaft welded to the shoe bracket 126, or some other type of pin that is not readily removable without the use of tools. The adjustment pin 134, on the other hand, can be a more readily removable pin such as a clevis pin for example with a corresponding cotter pin to keep the clevis pin from sliding or vibrating out of position. Each of the pins 132, 134 can be positioned through holes in the shoe bracket 126 and through corresponding holes in the mast. As can be understood from FIG. 5, where both pins 132, 134 are in position and tightly secured, the mast can be held in position and prevented from rotating about the pivot pin 132. However, when the adjustment pin 134 is removed, which can occur by removing the cotter pin and further removing the clevis pin, the mast can be pivoted relative to the shoe bracket 126.

Figure 8:
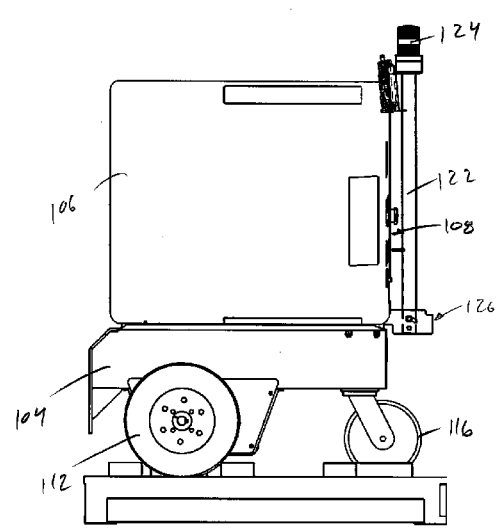
FIG. 8 is a side view of the machine of FIG. 1 with the hood in an open position.
Figure 9:
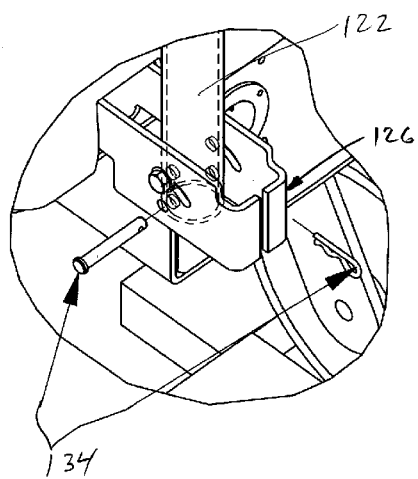
FIG. 9 is a rear/side perspective view of the shoe bracket of FIG. 5 depicting removal of an adjustment pin.
Figure 10:
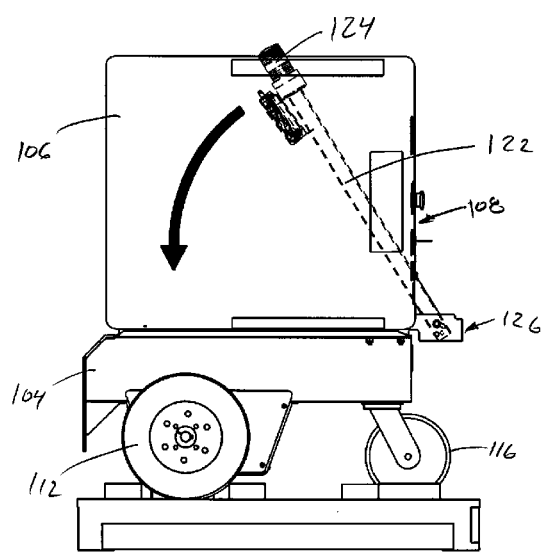
FIG. 10 is a side view of the machine of FIG. 1 depicting repositioning of the strobe tower.
Figure 11:
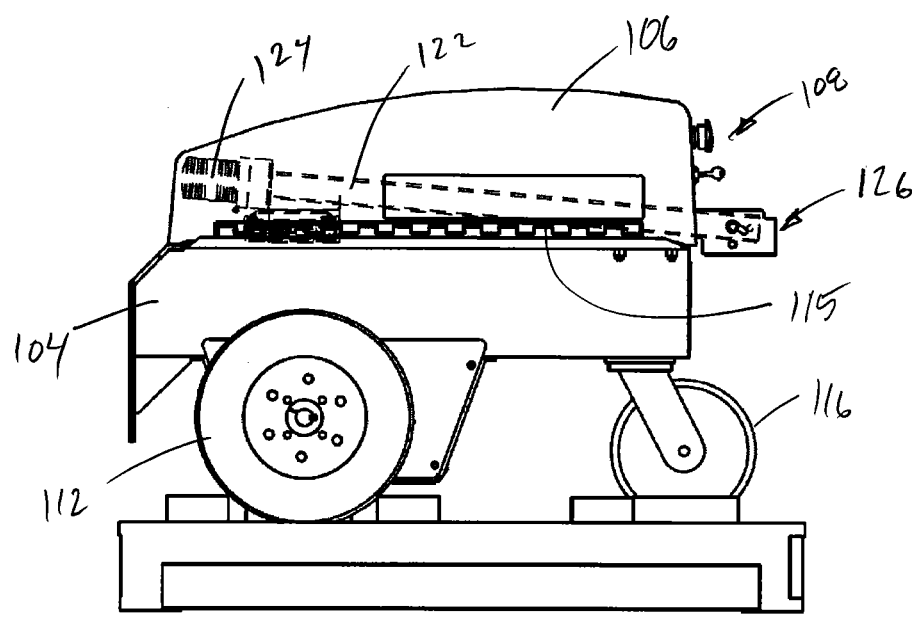
FIG. 11 is a side view of the machine of FIG. 1 with the strobe tower in a storage/shipping position with the hood in a closed position.
Figure 12:
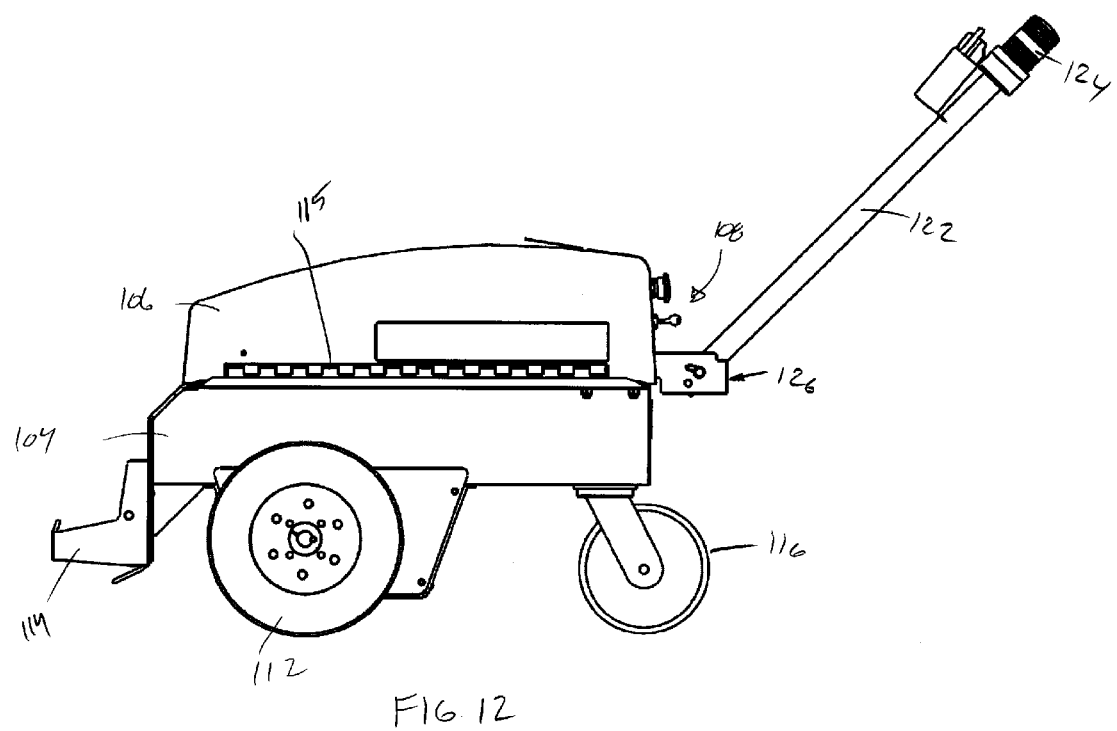
FIG. 12 is a side view of the machine of FIG. 1 depicting the functionality of the breakaway mechanism of FIG. 5.

Referring now to FIGS. 7-11, the shoe bracket 126 can be positioned relative to the body of the machine 100 such that pivoting motion of the mast in the shoe 126 allows the mast to be pivoted into a protected position. For example, as shown in FIG. 7, the shoe bracket 126 can be positioned along the height of the body near the seam between the belly 104 and the cover 106. Accordingly, as shown in FIG. 8, the cover can be removed or otherwise opened in anticipation of repositioning the mast. The adjustment pin 134 can be removed via removal of the cotter pin and the clevis pin and the mast can be rotated downward as shown in FIGS. 9 and 10. The mast can be positioned within the body and the cover 106 can be replaced to protect the mast as shown in FIG. 11. In some embodiments, the cover 106 is of a hood configuration with a pivoting hinge 115 on a one side and three additional free edges some of which may include decoupling connections. In these embodiments, the shoe bracket 126 can be mounted to the body along one of the free edges such that the hood can be allowed to open and the mast can be pivoted within the body for protection.

The machine can also include a breakaway mechanism. The breakaway mechanism can be adapted to allow relative motion between the beacon and the body of the machine. For example, if an obstruction is encountered, the breakaway mechanism may allow relative motion so as to avoid damage to the beacon. The breakaway mechanism can include a pivoting mechanism, a rotating mechanism, translating mechanism, or other relative motion mechanism that can be moveable when a force is applied. For example, a horizontal or vertical hinge, a slide plate, or a telescoping device can be used to allow relative motion of the beacon relative to the body. The breakaway mechanism can be positioned on the machine at a point between the chain of connections between the beacon and the body. That is, the breakaway mechanism can be positioned to allow the beacon to move relative to the mast or the mechanism can be positioned to allow the mast as a whole to move relative to the body. In another embodiment, the mechanism can be positioned within the mast allowing a portion of the mast to move relative to a portion that is held stationary. The breakaway mechanism can include a force resistive element such as a frictional connection, a biasing mechanism, or some other resisting element that functions to maintain the beacon in a use position and yet allows the beacon to move to a released position when a force is applied.

Referring again to FIGS. 4-6, the breakaway mechanism can be incorporated into the mast positioning mechanism. In this embodiment, the shoe bracket 126 of the pivotal connector of the mast positioning mechanism can include a radial slot 136 through which the pivot pin 132 extends. The radial slot 136 can be adapted to receive the pivot pin 132 and as such can have a width substantially equal to the thickness of the pivot pin 132. The radial slot 136 can have a radiused shape with a center point located at the longitudinal axis of the adjustment pin 134. The radial slot 136 can include two ends forming stopping points for the pivot pin 132 and thus defining the range of motion of the pivot pin 132. In this embodiment, the pivot pin 132 can include a tension based fastener such as a bolt that can be tightened to provide a frictional engagement between the plates 128 of the bracket 126 and the mast. Accordingly, and with reference to FIG. 12, the mast can be positioned in a use position that is generally upright. When an obstruction is encountered by the tower 122, strobe 124, or a portion thereof, (e.g., where the strobe 124 encounters a low door head) the frictional engagement of the bracket 126 on the mast may be overcome allowing the pivot pin 132 to translate along the radial slot 136 and allowing the mast to pivot about the adjustment pin 134. It is noted that the released position of the mast can be limited by the second end of the radial slot 136, wherein the pivot pin 132 can be prevented from traveling beyond the radial arc of the radial slot 136. The range of motion of the mast can be from approximately upright to approximately 60° from vertical. Preferably, the range of motion is from approximately upright to approximately 45° from vertical.

It is noted that in this embodiment, two pivot points are provided. A first pivot point can be provided by the pivot pin 132 when the adjustment pin 134 is removed and the mast is repositioned, for example for storage under the hood, by pivoting about the pivot pin 132. However, where the breakaway mechanism is incorporated into the mast positioning mechanism as shown, the adjustment pin 134 becomes the pivot point for this mode of functionality because the pivot pin 132 translates along the radial slot 136 whose center point is the longitudinal axis of the adjustment pin 134.

It is also noted that where the machine 100 is being moved without carts attached, the mast can be used to steer the machine. It can be convenient for a user to pivot the mast to a released position such that the machine can be steered from a position slightly offset from the machine 100 so as to avoid tripping on the machine 100 or leaning overly far to reach the mast. Accordingly, while the breakaway mechanism has been described in the context of encountering an obstruction, the breakaway mechanism can also be useful in tipping the mast to accommodate steering the machine 100.

Figure 13:
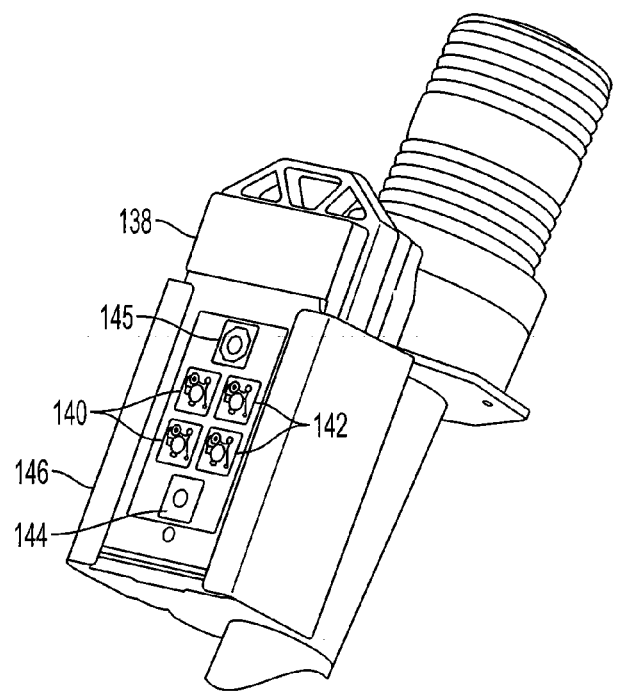
FIG. 13 is close-up view of a remote control in a holder positioned on the strobe tower of the machine of FIG. 1.

Referring now to FIG. 13, a remote control 138 can be provided. The remote control 138 can be adapted to control the machine 100 and can be in radio communication with the controller of the machine 100 via an antenna positioned on the machine 100. The remote 138 can include user interfacing elements such as a display, gauges, buttons, levers, switches, or other elements adapted to allow the user to monitor the machine and control the machine. In one embodiment, as shown, the remote control can include two forward speed buttons 140, two reverse speed buttons 142, a horn button 144, and a stop button 145. In other embodiments more or fewer buttons can be provided. For example a five button remote with a horn, two forward speed buttons and two stops can be provided. A single button remote can be provided, where a single forward speed button is used and when the button is released, the machine is directed to stop. In this embodiment, the horn button can be omitted. Those of skill in the art will understand and appreciate several additional button configurations.

Figure 14:
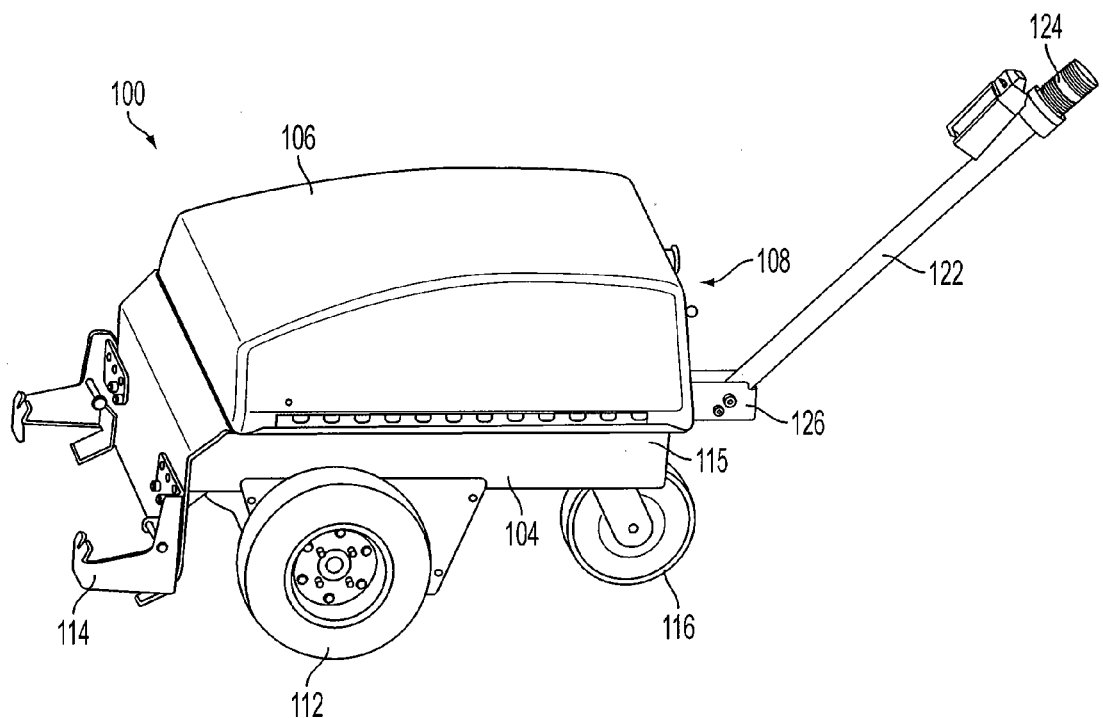
FIG. 14 is a front/side perspective view of the machine of FIG. 1 depicting the strobe tower in a breakaway/steering position.

The machine 100 can also be provided with a remote control holder 146. The holder 146 can be in the form of a storage bracket and can include a sleeve-type device allowing the relatively rectangular remote 138 to be sleevably slid into an open top of the device. The holder 146 can provide for a storage position for the remote 138 so as to avoid loss of the remote 138 and can be positioned in most any location on or off of the machine 100. In one embodiment as shown in FIGS. 13 and 14, the holder 146 can be positioned on the mast of the machine 100. Where the machine 100 is moving without being attached to a line of carts, the mast can be used to assist with steering the machine 100. Accordingly, with the forward and reverse buttons 140, 142 on the remote 138, it can be convenient to position the holder 146 for the remote 138 on the mast such that motion and steering can be controlled from a common location. Thus, when using the tower 122 for steering, one hand operation of the machine 100 may be possible by simultaneously pressing the remote buttons 140, 142 and gripping the tower 122.

In use, the mast of the cart pushing machine 100 can be assembled and the tower 122 can be positioned in a protected position under the hood with the adjustment pin 134 removed and the tower 122 pivoted within the hood about the pivot pin 132. It is noted that the radial slot 136 for the breakaway mechanism can provide from some translational movement of the tower 122 and can accommodate placing the tower 122 within the body of the machine 100. The hood can be closed over the top of the machine 100 and tower 122 thereby protecting the tower 122 and strobe 124 during shipping and any decoupling connections of the hood to the belly 104 can be secured.

Upon arrival at its use destination, the hood can be opened by releasing the decoupling connections and the tower 122 can be pivoted to an upright position about the pivot pin 132. A pivot hole in the base of the tower 122 can be aligned with a corresponding hole in the bracket 126 and the adjustment pin 134 can be inserted and secured thereby securing the tower 122 in an upright position. The hood of the machine 100 can be closed and the decoupling connections can be secured. It is noted that the tower 122 can be positioned in the protected or exposed positions at any time for purposes of storage, shipping, or at other times where damage to the tower 122 and/or strobe 124 is to be avoided.

The cart pushing machine 100 may be navigated by a user through a parking lot and can be used to collect and move carts. The tower 122 can be pivoted rearward for initial navigation of the machine 100. That is, the tower 122 can be pivoted to provide a location for the user to steer the machine 100 without tripping over the machine 100. The tower 122 may be pivoted by actuating the breakaway mechanism of the machine 100. That is, the tower 122 can be pivoted manually to the rear by forcing the mast to pivot about the adjustment pin 134 and causing the pivot pin 132 to slide along the radial slot 136. In this, non-cart mode, the remote 138 can be positioned in the holder 146 on the tower 122 to allow the machine 100 to be steered and controlled from a common location. The machine 100 can be used to approach carts and the hitch 114 can be engaged with the carts. Upon collection of one or more carts, the user can pivot the tower 122 back to the upright position and remove the remote 138 from the holder 146 and begin to control the machine 100 remotely and steering the machine 100. The machine 100 and the carts can be steered by controlling the direction of the leading cart in a line of carts.

The forward and reverse functions of the machine 100 can be controlled via the remote control 138. If an obstruction is encountered by the strobe 124 and/or tower 122, the breakaway mechanism can be actuated where the force from the obstruction overcomes the frictional engagement of the bracket 126 on the tower 122.

Figure 15:
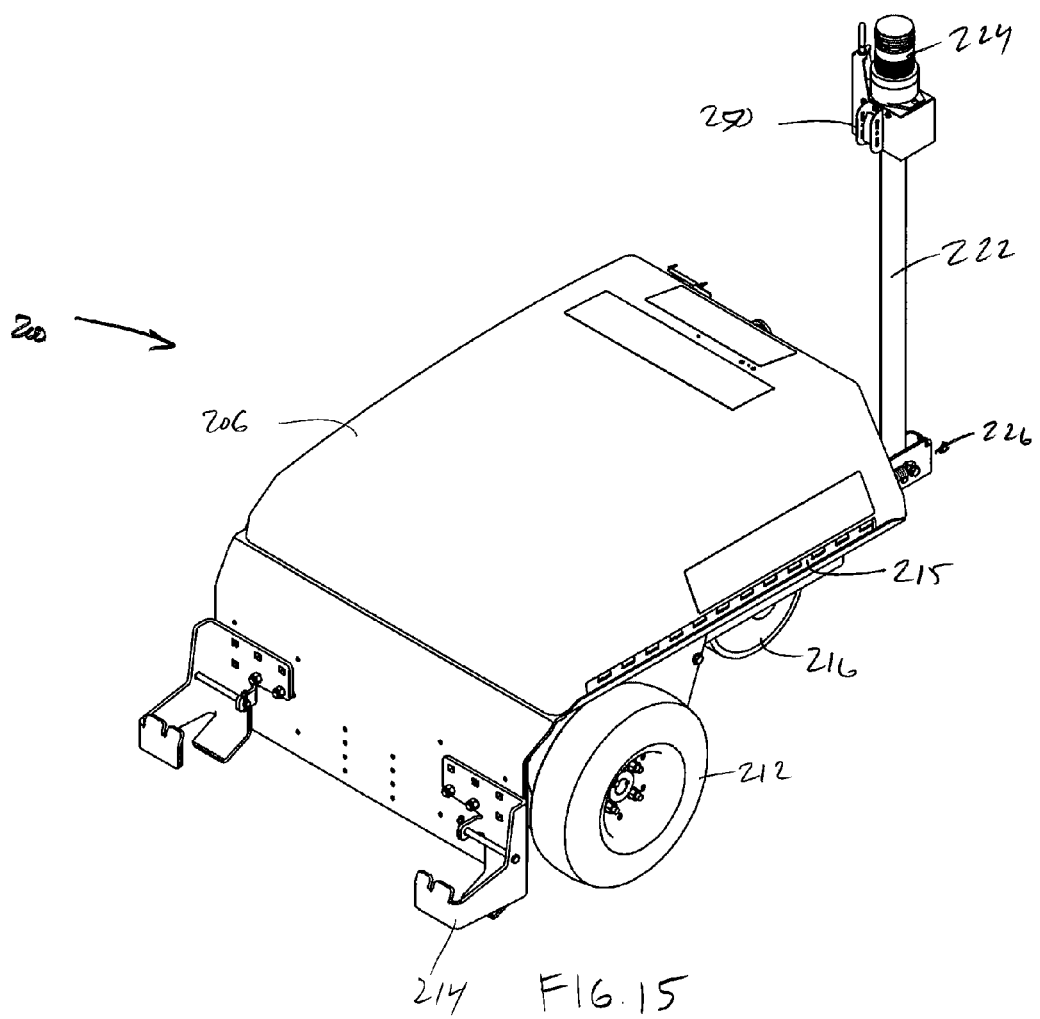
FIG. 15 is a front/side perspective view of a cart pushing machine according to another embodiment.
Figure 16:
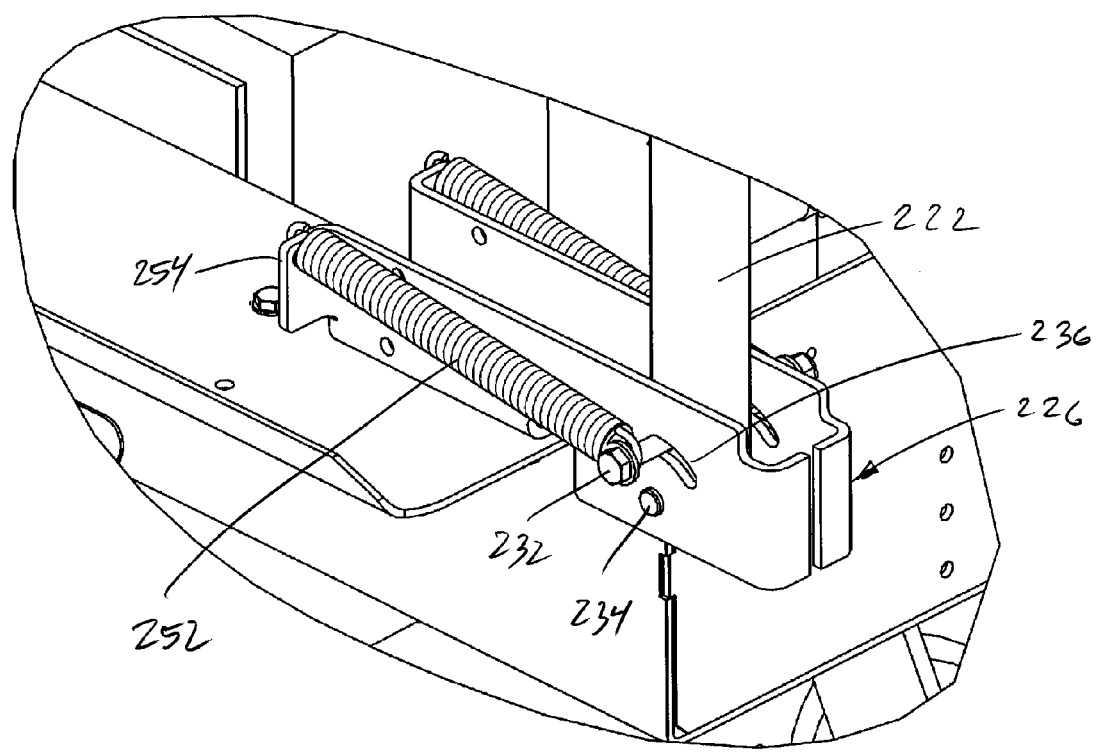
FIG. 16 is a close-up rear/side perspective view of a shoe bracket of the machine of FIG. 15, depicting another embodiment of an incorporated breakaway mechanism.
Figure 17:
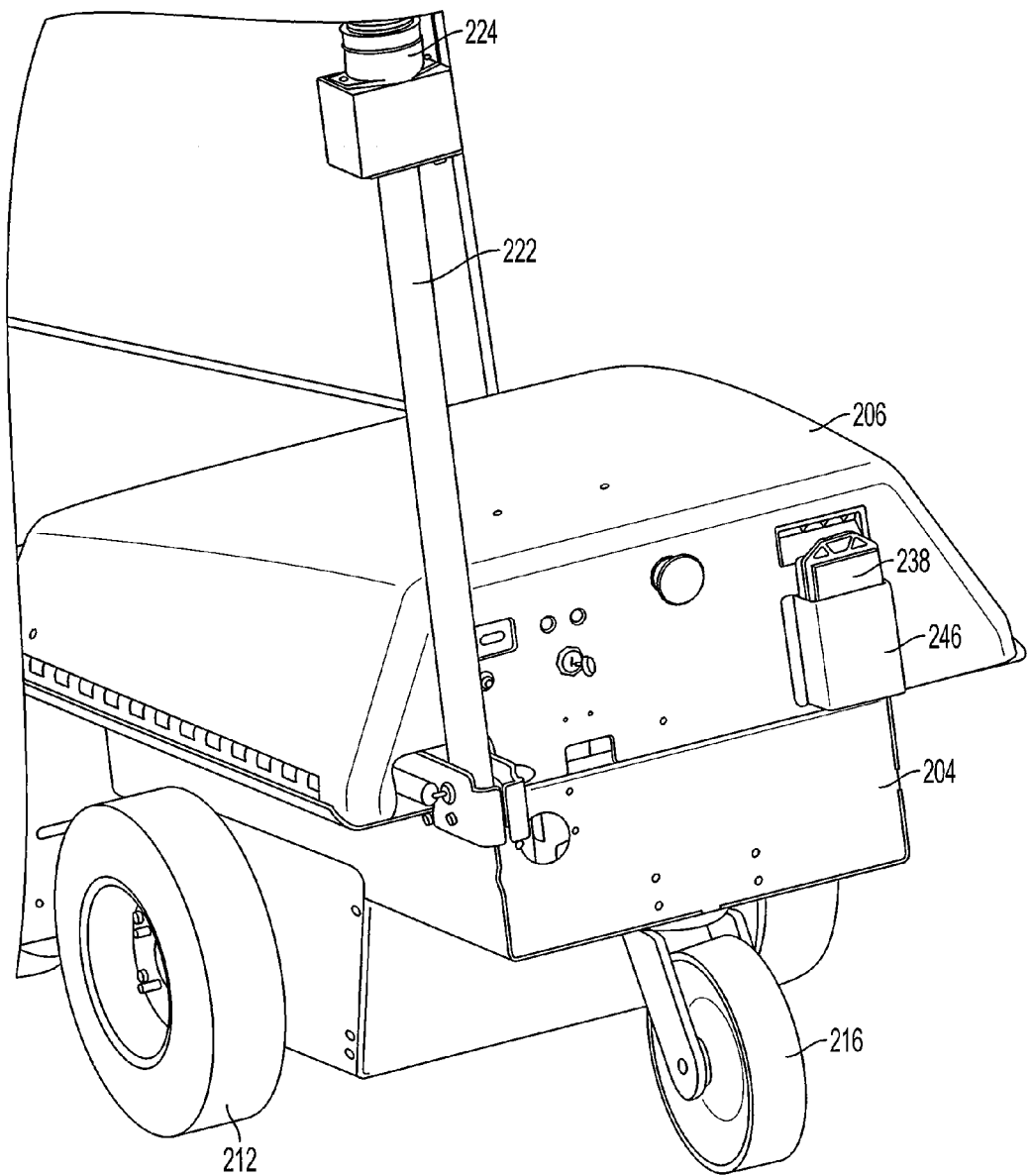
FIG. 17 is a rear/side perspective view of the machine of FIG. 15.
Figure 18:
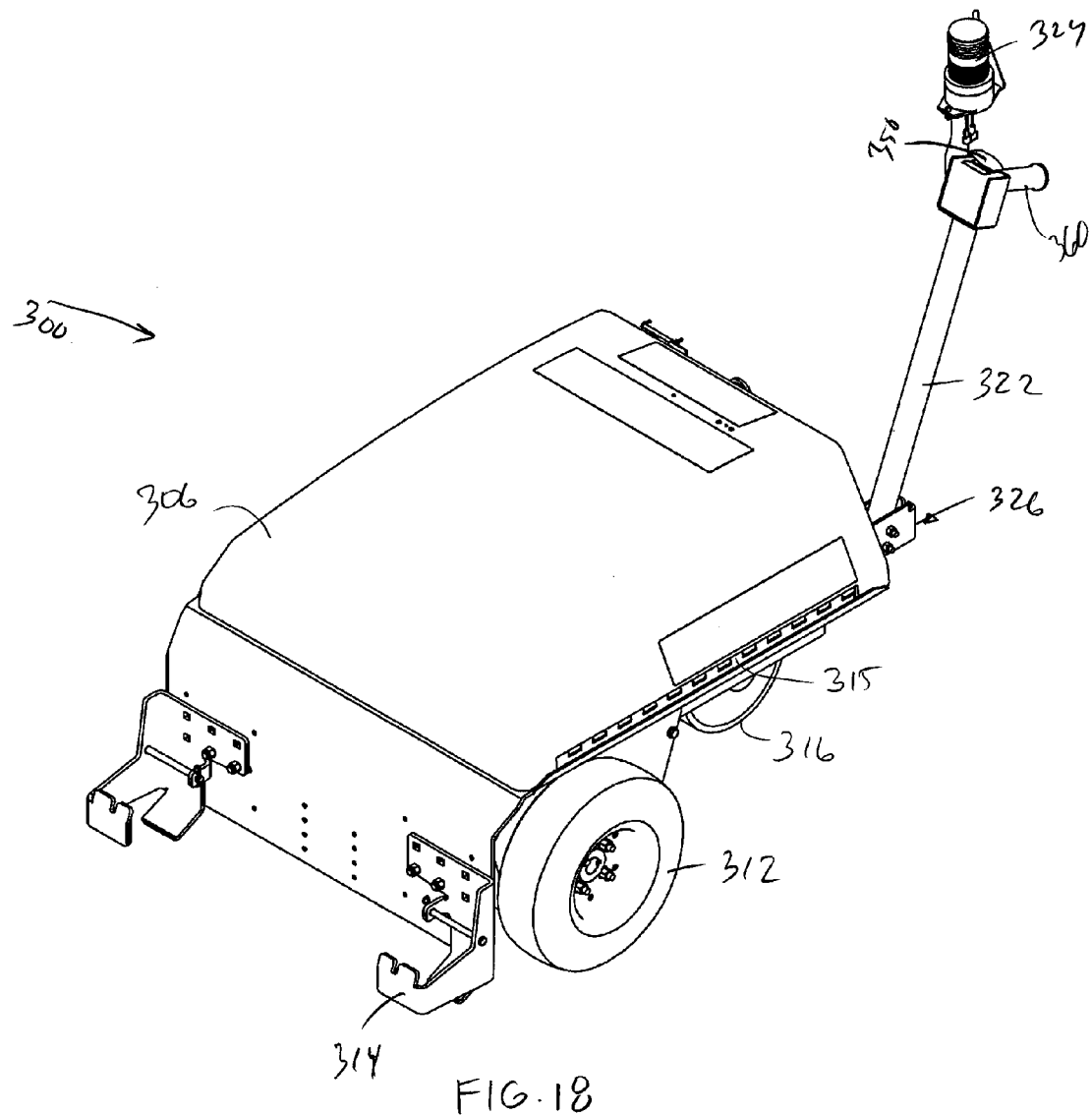
FIG. 18 is a front/side perspective view of a cart pushing machine according to another embodiment.

Referring now to FIGS. 15-17, another embodiment of a cart moving machine 200 is shown. In this embodiment, the cart machine 200 can include a body portion, a movement assembly, a hitch 214 positioned on the body and adapted to engage a cart, a mast extending from the body and including a beacon positioned thereon, and a mast positioning mechanism. The machine 200 can also include a breakaway mechanism and a controller for receiving instructions and controlling several aspects of the machine 200.

The body, the movement assembly, the hitch 214, the mast, and the beacon can include features that are the same or similar to the machine 100. However, in this embodiment, the breakaway mechanism and the remote control holder 246 can be slightly different. Additionally, a forward and reverse switch 250 can be provided on the mast.

Regarding the breakaway mechanism, reference is made to FIG. 16. As shown, the breakaway system of this embodiment can include a bracket 226, a pivot pin 232, and an adjustment pin 234 the same or similar to the breakaway mechanism previously described. However, the mast may be more freely positioned in the bracket 226 such that the bracket 226 does not frictionally engage the mast. This relatively free motion can be provided by an extended pivot pin 232. In lieu of the frictional engagement, the breakaway system can include a biasing mechanism adapted to bias the mast toward an upright position. The biasing mechanism can be in the form of and elastic strap, a spring, or other known biasing elements.

Still referring to FIG. 16, the biasing mechanism can be in the form of a spring 252 extending from the pivot pin 232 to an interior portion of the shoe bracket 226. In the present embodiment, two springs 252 are provided; one on either side of the shoe bracket 226. The shoe bracket 226 can extend into the body of the machine 200 and can include a return flange 254 on either side of the bracket 226. The spring 252 can thus extend from the pivot pin 232 to a hole or other securing point on the flange 254 of the shoe bracket 226. Accordingly, the spring 252 can be stretched between the pivot pin 232 and the securing point so as to cause the spring 252 to be in tension and biasing the pivot pin 232 toward a first end of the radial slot 236 where the mast is in an upright position. Where the beacon and/or mast encounters an obstruction, the force may overcome the spring constant of the spring 252 thereby elongating the spring 252 and allowing the pivot pin 232 to travel along the radial slot 236 and allowing the mast to pivot about the adjustment pin 234. When the force from the obstruction is removed, the spring 252 can then cause the mast to return to its upright position where the tension in the spring 252 causes the pivot pin 232 to travel back along the radial slot 236 to the first end.

Referring now to FIG. 17, the remote control holder 246 can be provided on the body of the machine 200. Additionally, a forward and reverse switch 250 can be provided on the tower 222 as best shown in FIG. 15. The switch 250 can be provided near the top of the tower 222 and can include a forward position, a reverse position, and a neutral position. The forward position can provide for a single forward speed and likewise, the reverse position can provide for a single reverse speed, which can be different from the forward speed. The switch 250 can be used drive the machine 200 or adjust the position of the machine 200 relative to a cart or several carts. Accordingly, the controller of the machine 200 can be adapted to cause the machine 200 to transition gradually between its current state of motion and the switch selected motion. That is, if the machine 200 is in a stopped state, switching the switch 250 to forward can cause the machine 200 to accelerate gradually from a stopped condition to the speed selected for the forward position. Likewise, when switched from forward to neutral, the machine 200 can decelerate from the forward speed to stopped. This feature can avoid abrupt changes in speed which can be dangerous when attaching carts or positioning the machine 200 relative to carts. It is noted that while a switch 250 has been described, the switch 250 can be in the form of a dial, lever, button, or other actuatable element. Additionally or alternatively, a variable speed control can also be provided.

In use, the machine 200 can be used similarly to the machine 100. However, as mentioned, the remote control holder 246 can be positioned on the body and accordingly, navigating the machine 200 without a cart attached can be performed by controlling the machine 200 with the remote 238 removed from the holder 246 and steering with the tower 222, or the switch 250 on the tower 222 can be used in lieu of the remote 238. Also, it is to be noted that pivoting the tower 222 to the steering position may be performed by overcoming the biasing force of the biasing mechanism rather than the frictional engagement like machine 100.

Referring now to FIGS. 18-21, another embodiment of a cart moving machine 300 is shown. In this embodiment, the cart machine 300 can include a body portion, a movement assembly, a hitch 314 positioned on the body and adapted to engage a cart, a mast extending from the body and including a beacon positioned thereon, and a mast positioning mechanism. The machine 300 can also include a breakaway mechanism and a controller for receiving instructions and controlling several aspects of the machine 300.

The body, the movement assembly, the hitch 314, the mast, and the beacon can include features that are the same or similar to the machines 100 and 200. Additionally, a remote holder 346 and a switch 350 can be provided similar to that described with respect to machine 200. However, in this embodiment, the breakaway mechanism can be slightly different and a handle 260 can be provided.

Figure 19:
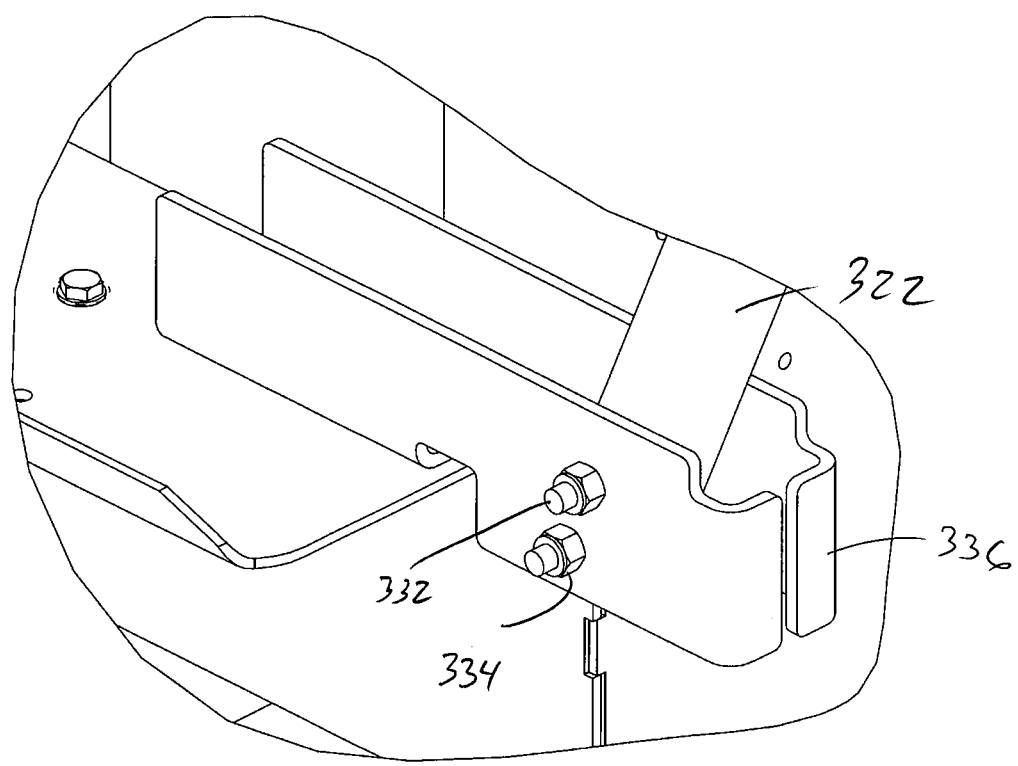
FIG. 19 is a close-up rear/side perspective view of a shoe bracket of the machine of FIG. 18.
Figure 20:
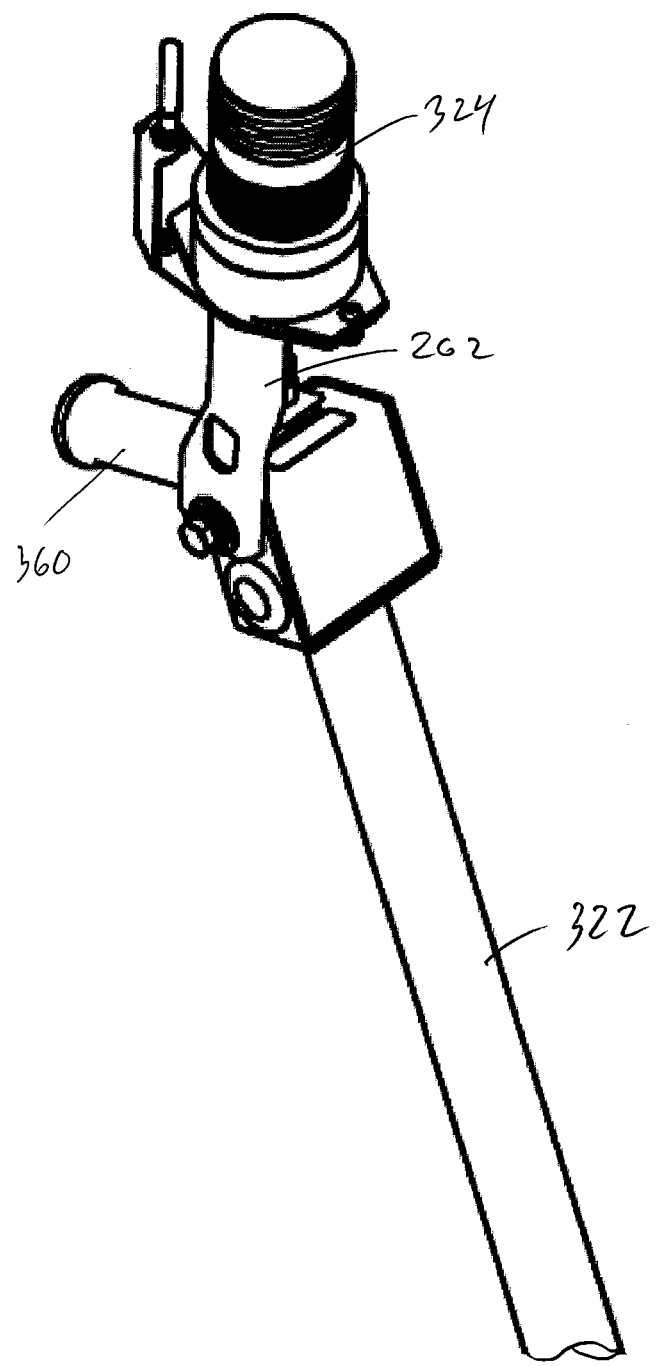
FIG. 20 is a close-up front/side perspective view of a breakaway mechanism of the machine of FIG. 18.

Regarding the breakaway mechanism, reference is made to FIGS. 19 and 20. As shown, in this embodiment, the breakaway mechanism can be adapted to allow relative motion between the beacon and the mast. Accordingly, as shown in FIG. 19, the mast positioning mechanism may omit the radial slot in the bracket due 326 to the breakaway system being provided elsewhere. In this embodiment, the angle of the mast can be determined by the orientation of the adjustment pin 334 and the pivot pin 332 relative to the bracket 326. The angle can be selected such that a user steering the machine 300 can grasp the mast and walk without tripping on the machine 300. Accordingly, in contrast to the previous embodiments, the present embodiment can include an in use position that is generally upright, but slightly tipped. Considerations can also be given to storage of the machine 300 and the footprint of the machine 300 with the mast in a tipped position. As with the mast positioning mechanisms previously described, the adjustment pin 334 can be removed and the mast can be pivoted about the pivot pin 332 when the mast positioning mechanism is to be positioned in a protected position.

Figure 21:
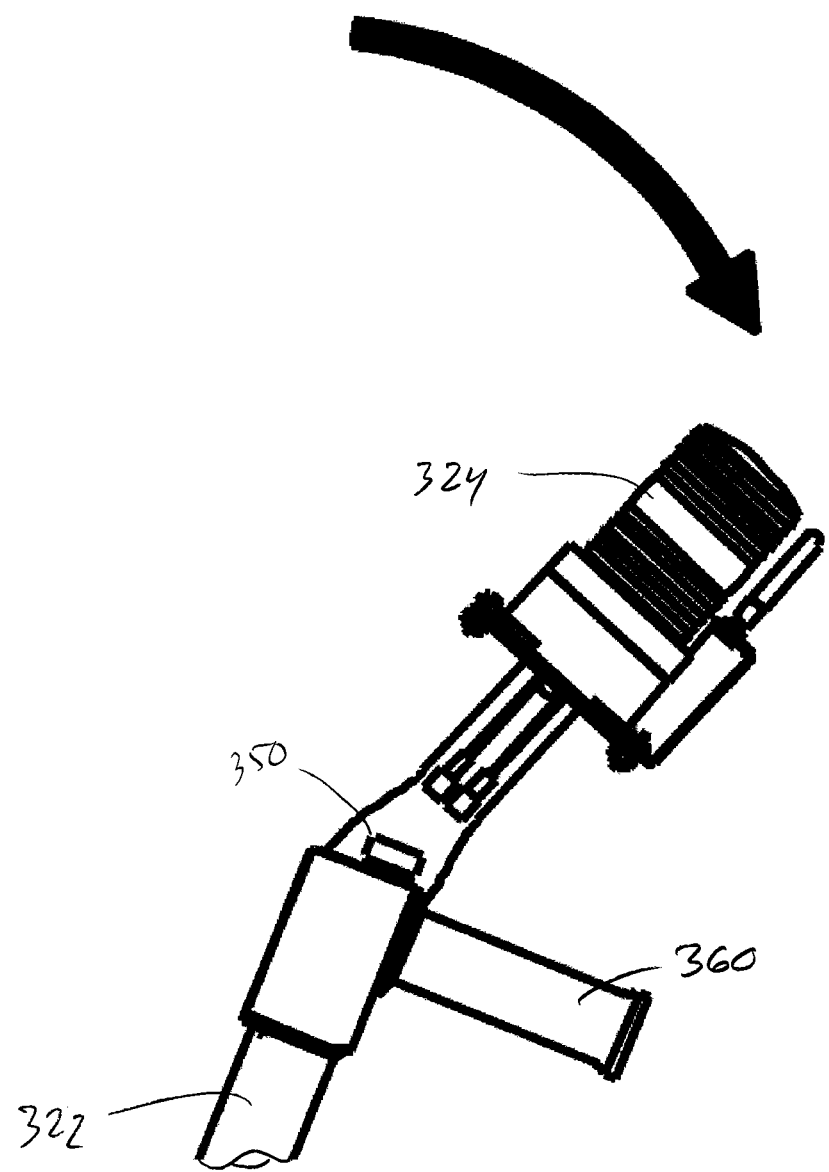
FIG. 21 is a close-up side view of a top portion of a strobe tower of the machine of FIG. 18 depicting the functionality of the breakaway mechanism of FIG. 20.

The breakaway system can include a pivotal member 262 connected to the beacon and pivotally connected to the mast. The pivotal member 262 can be a bracket, a flat plate, or another alternatively shaped member adapted to pivot relative to the mast. In one embodiment, as shown in FIG. 20, the pivotal member 262 can be in the form of a tube with a stamped end providing a flat surface for placement adjacent to the mast. The pivotal member 262 can be bolted or otherwise fastened to the mast so as to provide a frictional engagement between the pivotal member 262 and the mast. Accordingly, an obstruction encountered by the beacon can cause pivotal motion of the beacon about the connection of the pivotal member 262 to the mast as shown in FIG. 21. Upon removal of the obstruction or relocation of the machine to avoid the obstruction, the beacon can be pivoted back to its upright position.

Referring to FIG. 21, the mast of the present embodiment can also include a handle 360 to facilitate a more ergonomic grip on the mast for use in steering the machine 300. The handle 360 can be a cylindrical handle extending from the mast. The handle 360 can be in the form of a pistol type grip or bicycle type grip for example. As shown the handle 360 can extend generally orthogonally to the mast and can be directed generally rearwardly from the machine 300. In other embodiments, the handle 360 can extend generally orthogonally to the mast and be directed in a sideways manner. In other embodiments, the handle 360 may not be orthogonal to the mast. In the embodiment shown, the switch 350, as described with respect to the machine 200, can be positioned on the mast relatively close to the handle 360 and positioned on a top surface of the mast. Accordingly, the switch 350 can be presented to the thumb where the handle 360 is grasped by a user. The switch 350 can be a lever type switch or a push button type switch or another actuatable element.

In use, the present machine 300 can be navigated and used most similarly to machine 200. However, as noted, the user can grasp the handle 360 rather than the tower 322. In addition, the switch 350 position may allow a user to trigger the forward and reverse switch with a thumb or another hand.

The disclosed machine can perform the similar functions when compared to prior art machines and yet may include fewer elements by omitting duplicated features. For example, the strobe tower doubling as a steering handle when no carts are in place can allow a dedicated steering handle to be omitted, thereby maintaining functionality and yet saving costs by reducing material and labor costs.

The breakaway feature can provide two purposes including preventing damage to the beacon and, in some embodiments, allowing the mast to serve as a steering handle. Further versatility in the mast allows it to be folded under the body cover of the machine for protection and safe keeping during storage, shipping, or other times.

Although the present invention has been described with reference to preferred embodiments, persons skilled in the art will recognize that changes may be made in form and detail without departing from the spirit and scope of the invention. For example, the features of the several embodiments can be combined, exchanged, or otherwise interchanged without departing from the invention. A double breakaway mechanism can be provided, for example, or a handle can be provided on machines 100 or 200. Additional modifications can be made without departing from the invention.

What is claimed is:

1. A cart moving machine comprising:
    a. a substantially rectangular body, defined by a front portion, two generally parallel side portions, and a rear portion;
    b. a movement assembly positioned on the body and including a power source coupled to a drive mechanism, the movement assembly being adapted to translate the machine relative to a surface;
    c. a hitch positioned on the front portion of the body and adapted to engage a cart;
    d. a mast extending from the rear portion of the body, opposite the hitch and including a beacon positioned thereon; and
    e. a mast positioning mechanism, the mechanism adapted to allow the mast to be selectively positionable relative to the body between an enclosed position toward the hitch and an exposed upright position.

2. The machine of claim 1, wherein the mast positioning mechanism is a pivotal connector and the mast is selectively pivotal between the enclosed position and the exposed position.

3. The machine of claim 2, wherein the pivoting connector is a frictional pivotal connector.

4. The machine of claim 2, wherein the pivotal connector includes:
    a. a bracket connected to the body; and
    b. a first pivot pin extending through the bracket and the mast.

5. The machine of claim 4, wherein the bracket includes a radial slot with a center point located at the longitudinal axis of the first pivot pin, the pivotal connector further comprising a second pivot pin extending through the radial slot and the mast.

6. The machine of claim 5, wherein the first pivot pin is a removable pin.

7. The machine of claim 2, wherein:
    a. the enclosed position includes a position within a housing of the body; and
    b. the exposed position includes a position outside the housing, the exposed position adapted to suitably present the beacon.

8. The machine of claim 7, wherein the exposed position is a generally upright position.

9. The machine of claim 8, wherein the exposed position includes a slightly tipped position.

10. The machine of claim 1, wherein the machine further includes a breakaway mechanism adapted to allow the beacon to move relative to the machine from a use position to a released position when a force is applied.

11. The machine of claim 10, wherein the breakaway mechanism is incorporated into the mast positioning mechanism.

12. The machine of claim 11, wherein the breakaway mechanism is a friction based mechanism.

13. The machine of claim 11, wherein the breakaway mechanism includes a biasing mechanism adapted to return the beacon from the released position to the use position when the force is no longer applied.

14. The machine of claim 10, wherein the breakaway mechanism is adapted to allow relative motion of the beacon relative to the mast.

15. The machine of claim 1, further comprising a remote control in communication with the movement mechanism.

16. The machine of claim 1, further comprising a directional switch in communication with the movement mechanism.

17. The machine of claim 16, wherein the directional switch includes a forward position, a stop position, and a reverse position.

18. The machine of claim 17, wherein the movement mechanism is adapted to gradually transition between forward translation and stop and between reverse translation and stop.

19. The machine of claim 1 further comprising a handle positioned on the mast.

20. The machine of claim 19, wherein the handle is a cylindrical grip.

21. A cart moving machine comprising:
   a. a substantially rectangular body, defined by a front portion, two generally parallel side portions, a rear portion and a top portion;
   b. a movement assembly positioned on the body and including a power source coupled to a drive mechanism, the movement assembly being adapted to translate the machine relative to a surface;
   c. a hitch positioned on the front portion of the body and adapted to engage a cart;
   d. a mast extending from the rear portion of the body, opposite the hitch and including a beacon positioned thereon;
   e. a mast positioning mechanism, the mechanism adapted to allow the mast to be selectively positionable relative to the body between an enclosed position inside the substantially rectangular body toward the hitch and an exposed upright position outside the substantially rectangular body;
   f. a remote control in communication with the movement mechanism; and
   g. a remote control holder secured to the machine.

22. The machine of claim 21, wherein the holder is secured to the mast.

23. The machine of claim 21, wherein the holder is secured to the body.

24. The machine of claim 21, wherein the substantially rectangular body further comprises an opening of sufficient size to accommodate the mast in the enclosed position.

25. The machine of claim 24, wherein the substantially rectangular body further comprises a hinge.

* * * * *